United States Patent [19]

Mizrah et al.

[11] Patent Number: 4,857,088

[45] Date of Patent: Aug. 15, 1989

[54] FILTER FOR CLEANING THE EXHAUST GASES FROM DIESEL ENGINES

[75] Inventors: Tiberiu Mizrah, Schaffhausen; Albert Maurer, Thayngen; Ludwig Gauckler, Schaffhausen, all of Switzerland

[73] Assignee: Swiss Aluminum Ltd., Chippis, Switzerland

[21] Appl. No.: 128,222

[22] Filed: Dec. 3, 1987

[30] Foreign Application Priority Data

Dec. 23, 1986 [CH] Switzerland .......................... 5123/86

[51] Int. Cl.⁴ ................................................ B01D 46/00

[52] U.S. Cl. ................................ 55/523; 55/DIG. 30; 60/311

[58] Field of Search ............. 55/97, 96, 523, DIG. 30; 60/311

[56] References Cited

U.S. PATENT DOCUMENTS 4,451,441 5/1984 Ernest et al. .......................... 55/487
4,600,562 7/1986 Virk et al. ............................. 55/487
4,632,683 12/1986 Fukutani et al. ...................... 55/523

FOREIGN PATENT DOCUMENTS 93915 6/1983 Japan .................................... 60/311

*Primary Examiner*—Bernard Nozick
*Attorney, Agent, or Firm*—Bachman & LaPointe

[57] ABSTRACT

In filters for cleaning the exhaust gases from diesel engines having openpored foam ceramic bodies, the deposited soot particles are burned up at temperatures of between 550° and 700° C. at periodic intervals. In order to lower the inflammation temperature of the soot in the regeneration phase of the filter, the ceramic bodies are catalytically coated.

The region of the openpored foam ceramic body first subjected to the flow of the exhaust gases of the diesel engines has at least partly a denser pore structure than the remaining foam body so that the inflammation temperature can be lowered since temperature peaks occur in these regions on account of increased soot deposits, which temperature peaks lead to inflammation of the soot located there and consequently burn up all the soot deposited in the filter.

10 Claims, No Drawings

FILTER FOR CLEANING THE EXHAUST GASES FROM DIESEL ENGINES

The present invention relates to a filter for cleaning the exhaust gases from diesel engines.

There are basically two ways in which the soot constituents of the exhaust gases from diesel engines can be reduced: by optimization of the mixture preparation and of the combustion process in the engine and by the installation of filters in the exhaust stream. Depending on the design of the filter, usually soot separation levels of 50 to 90% are achieved.

Since the diesel exhaust soot filter would already by clogged with soot within a short time of use, soot must be periodically burned out. The period of time from one regeneration phase to the other is known as the regeneration interval. Under certain conditions, the filter regenerates itself. The soot deposits are in this case burned out at temperatures of between 550 and 700° C. With catalytically coated filters, the inflammation temperature may be reduced to approximately 400° C.

It is known from U.S. Patent Specification No. 4,264,346 to use for the abovementioned purposes an openpored foam ceramic as active filtering medium. An openpored foam ceramic is understood here as meaning a porous ceramic body having a threedimensional network and cellular structure, which contains a plurality of cavities passing through. The ceramic body, usually cylindrical or comprising several discs, is brought into the exhaust stream from diesel engines in such a way that the exhaust gases meet the said ceramic body face on and flow through axially parallel or with restricted guidance. The soot separation occurring is at its greatest in the part of the filter initially flowed through and decreases rapidly with increasing throughflow.

This has the consequence that the filter has reached its soot deposition absorption capacity after a relatively short time in the region first subjected to flow and has to be regenerated, while the remaining region of the filter can still absorb soot however, but likewise already undergoes the regeneration process.

In order to distribute more evenly the soot absorption capacity of the filter over the complete cross-section in throughflow direction of the exhaust, it has already been proposed to provide the region of the ceramic body first subjected to flow with larger cavities than the region last subjected to flow in order thereby to prevent the filter clogging prematurely in the region first subjected to flow. In European Patent Specification No. 0,050,340, an exhaust filter device is described which contains such a ceramic body comprising two clearly delimited regions having different cavities. The region first subjected to the flow of the exhaust gases is to have 6 to 50 cavities per 2.54 cm, the subsequent region 20 to 150 cavities per 2.54 cm.

Although the soot deposition absorption capacity of the ceramic filter can be improved by the abovementioned measures, no attention has been paid to the problem of reducing the inflammation temperature of the deposited soot in order to introduce the regeneration phase as early as possible.

SUMMARY OF THE INVENTION

The inventors have therefore set themselves the object of lowering the soot inflammation temperature in filters for cleaning the exhaust gases from diesel engines with openpored foam ceramic. by a filter which is characterized in that the region of the foam ceramic first subjected to the flow of the exhaust has at least partly a denser pore structure than the remaining region.

Owing to the fact that the region of the foam ceramic first subjected to the flow of the exhaust stream already partly has a denser pore structure, which means that the cavities in this region are smaller (that is, a fine pore structure), the soot will be deposited to a greater extent in the region having the denser pore structure and lead locally to a heat accumulation with substantially higher temperature peaks. These locally occurring temperature peaks in turn lead locally to a burnup of the soot there and thus initiate, by the flame progression through the entire foam ceramic filter, the regeneration phase of the same, the inflammation temperature of the soot deposited in regions of the foam ceramic which do not have the denser pore structure lying considerably lower than that effected by the means mentioned at the start.

In order not to increase substantially the resistance of the filter, which generates a counter pressure with respect to the exhaust, which would entail a reduction in the engine power and an increase in the fuel consumption, it has proved favourable to provide about 20 to 50% of the area first subjected to the exhaust stream with a material having a denser pore structure.

In the case of diesel engines equipped with exhaust filters which are used in passenger cars, the counter pressure should not exceed 0.2 bar. It has been found that such conditions are met if the filter according to the invention consists of an openpored foam ceramic which has 1 to 50% by volume, preferably 10 to 25% by volume of material having a denser pore structure. For the coarser ceramic material, one having 3 to 80 pores per 2.54 cm, for the finer ceramic material, one having 40 to 100 pores per 2.54 cm is preferably chosen, the difference in the number of pores per 2.54 cm being at least 10, preferably 20, in the case of the two materials.

It has proved advantageous furthermore to produce, in a way known per se, a cross-sectional area of the open foam ceramic first subjected to the flow of the exhaust stream of at least 200, preferably 250 $cm^2$.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. Filter for cleaning exhaust gases from diesel engines, said filter being positioned within a stream of said exhaust gases and being formed from an open pored foamed ceramic body comprising a first ceramic material having a relatively fine pore structure and a second ceramic material having a coarser pore structure as compared to said pore structure of said first material, said filter having a surface first exposed to said exhaust gases comprising a first and a second portion wherein from about 20% to about 50% of the area of the first portion of said surface first exposed to said exhaust gas is formed from said relatively fine first material so as to lower the inflammation temperature of soot deposited in said filter and the second portion of said first surface being formed from said coarser second material.

2. Filter according to claim 1 characterized in that the region of said first material having said relatively fine pore structure is such that any counterpressure created in said filter does not exceed 0.2 bar.

3. Filter according to claim 1 characterized in that the second coarser material has 30 to 80 pores per 2.54 cm, the first ceramic material has 40 to 100 pores per 2.54 cm, and the difference in the number of pores of said first and second materials being at least 10 pores per 2.54 cm.

4. Filter according to claim 3 characterized in that the difference in the number of pores of said first and second materials being 20 pores per 2.54 cm.

5. Filter according to claim 1 characterized in that the area of said first surface exposed to said exhaust gas stream is at least 200 $cm^2$.

6. Filter according to claim 5 characterized in that the area of said first surface exposed to said exhaust gas stream is at least 250 $cm^2$.

7. Filter according to claim 2 characterized in that the second coarser material has 30 to 80 pores per 2.54 cm, the first ceramic material has 40 to 100 pores per 2.54 cm, and the difference in the number of pores of said first and second materials being at least 10 pores per cm.

8. Filter according to claim 7 characterized in that the difference in the number of pores of said first and second materials being 20 pores per cm.

9. Filter according to claim 2 characterized in that the area of said first surface exposed to said exhaust gas stream is at least 200 $cm^2$.

10. Filter according to claim 9 characterized in that the area of said first surface exposed to said exhaust gas stream is at least 250 $cm^2$.

* * * * *